United States Patent
Yoshida et al.

(10) Patent No.: US 9,698,929 B2
(45) Date of Patent: Jul. 4, 2017

(54) OPTICAL RECEIVER THAT HAS FUNCTION TO DETECT SIGNAL SUPERIMPOSED ON OPTICAL SIGNAL AND METHOD FOR RECEIVING OPTICAL SIGNAL

(71) Applicant: FUJITSU LIMITED, Kawasaki-shi, Kanagawa (JP)

(72) Inventors: Setsuo Yoshida, Inagi (JP); Goji Nakagawa, Sagamihara (JP); Tomohiro Yamauchi, Kawasaki (JP); Kyosuke Sone, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/051,745

(22) Filed: Feb. 24, 2016

(65) Prior Publication Data

US 2016/0277139 A1 Sep. 22, 2016

(30) Foreign Application Priority Data

Mar. 19, 2015 (JP) ................................ 2015-056231

(51) Int. Cl.
*H04J 14/02* (2006.01)
*H04B 10/077* (2013.01)

(52) U.S. Cl.
CPC ........ *H04J 14/021* (2013.01); *H04B 10/0775* (2013.01); *H04B 10/0779* (2013.01); *H04J 14/0221* (2013.01)

(58) Field of Classification Search
CPC .. H04J 14/021; H04J 14/0205; H04J 14/0212; H04J 14/0221; H04J 14/0258;

(Continued)

(56) References Cited

U.S. PATENT DOCUMENTS 6,031,644 A * 2/2000 Utsumi ................ H04B 10/077
372/34
8,270,843 B2 * 9/2012 Nakamoto ......... H04B 10/2507
398/159

(Continued)

FOREIGN PATENT DOCUMENTS

JP 2013-9238 1/2013
JP 2014-150447 8/2014

*Primary Examiner* — Hibret Woldekidan
(74) *Attorney, Agent, or Firm* — Fujitsu Patent Center

(57) ABSTRACT

An optical receiver receives a wavelength multiplexed optical signal including wavelength channels. A superimposition signal is superimposed by frequency modulation on each of the wavelength channels. The optical receiver includes: an optical filter that filters the wavelength multiplexed optical signal; a filter controller that controls a wavelength of a transmission band of the optical filter; a photo detector that generates an intensity signal representing a change in the intensity of an output light of the optical filter; an signal detector that detects, according to the intensity signal, a superimposition signal superimposed on a specified wavelength channel. The filter controller controls the wavelength of the transmission band so that the amplitude of the intensity signal is larger, and then controls the wavelength of the transmission band so that the number of errors in the superimposition signal detected by the signal detector is reduced.

6 Claims, 15 Drawing Sheets

(58) Field of Classification Search
CPC .............. H04J 14/0257; H04J 14/0201; H04B 10/0775; H04B 10/0795; H04B 10/675; H04B 1/30; H04B 2203/5491; H04B 2210/074; H04B 10/077; H04B 10/07957; H04B 10/60; H04B 10/07953; H04B 10/564; H04B 10/0779; H04B 10/611; H04B 10/6165
USPC ............................ 398/202, 207–213, 85, 25
See application file for complete search history.

(56) References Cited

U.S. PATENT DOCUMENTS

| | | | |
|---|---|---|---|
| 8,965,202 B2* | 2/2015 | Sone | H04B 17/00 398/25 |
| 9,071,378 B2* | 6/2015 | Hoshida | H04J 14/02 |
| 9,143,242 B2* | 9/2015 | Nakagawa | H04B 10/60 |
| 9,281,913 B2* | 3/2016 | Hironishi | H04J 14/0201 |
| 9,350,479 B2* | 5/2016 | Sone | H04J 14/0212 |
| 9,444,573 B2* | 9/2016 | Nakagawa | H04J 14/0212 |
| 2004/0197099 A1* | 10/2004 | Kai | H04B 10/572 398/85 |
| 2004/0208428 A1* | 10/2004 | Kikuchi | G02B 6/29358 385/24 |
| 2007/0297804 A1* | 12/2007 | Honda | H04B 10/25133 398/147 |
| 2008/0175602 A1* | 7/2008 | Mitani | H04B 10/66 398/202 |
| 2012/0328297 A1 | 12/2012 | Hoshida | |
| 2013/0251365 A1* | 9/2013 | Sone | H04B 17/00 398/38 |
| 2014/0205281 A1* | 7/2014 | Sone | H04J 14/0212 398/25 |
| 2014/0219662 A1 | 8/2014 | Hironishi et al. | |
| 2014/0270781 A1* | 9/2014 | Nakagawa | H04B 10/60 398/83 |
| 2014/0363176 A1* | 12/2014 | Mizuguchi | H04B 10/611 398/204 |
| 2016/0277139 A1* | 9/2016 | Yoshida | H04J 14/0205 |
| 2016/0337039 A1* | 11/2016 | Huang | H04B 10/516 |

* cited by examiner

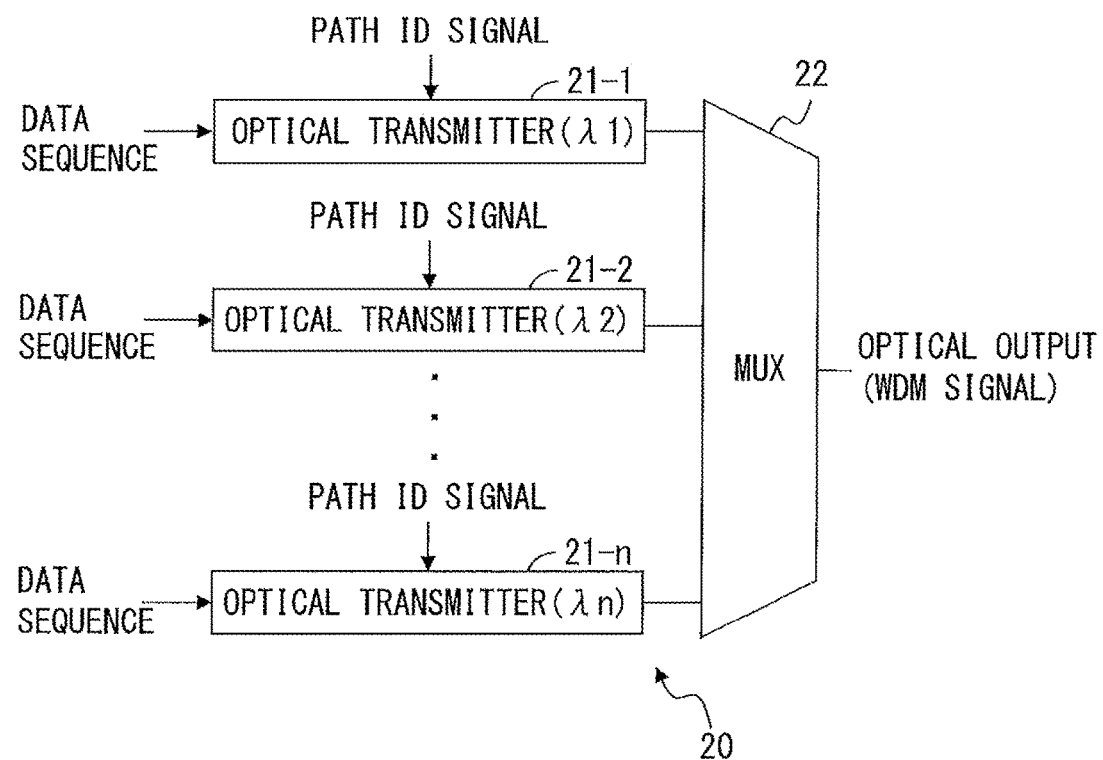
F I G. 2

| PREAMBLE (SPECIFIED DATA PATTERN) | PAYLOAD (PATH ID) | ERROR DETECTION CODE (ERROR CORRECTION CODE) |
|---|---|---|

FIG. 3

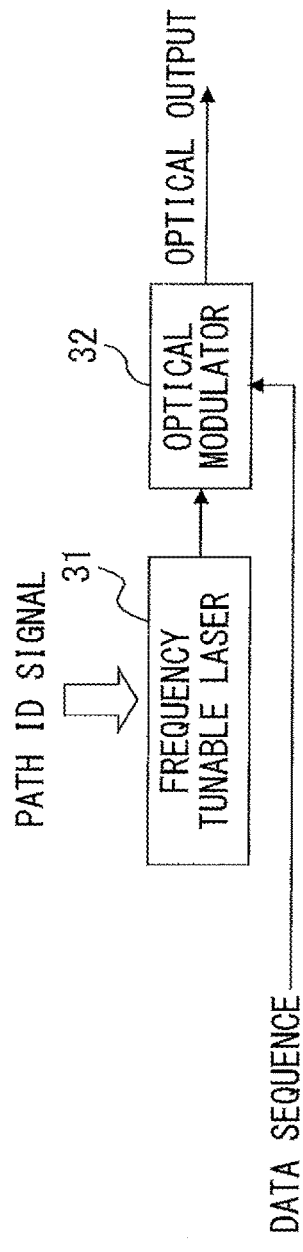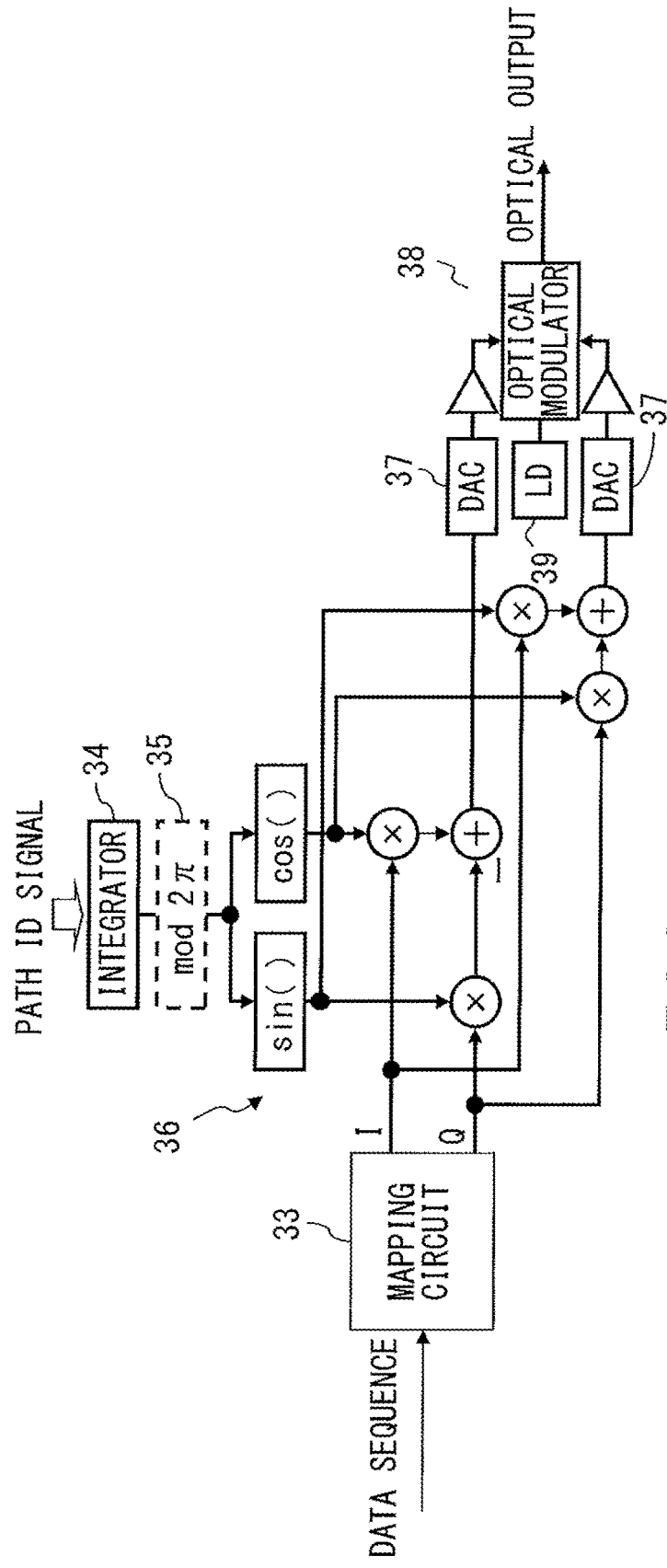

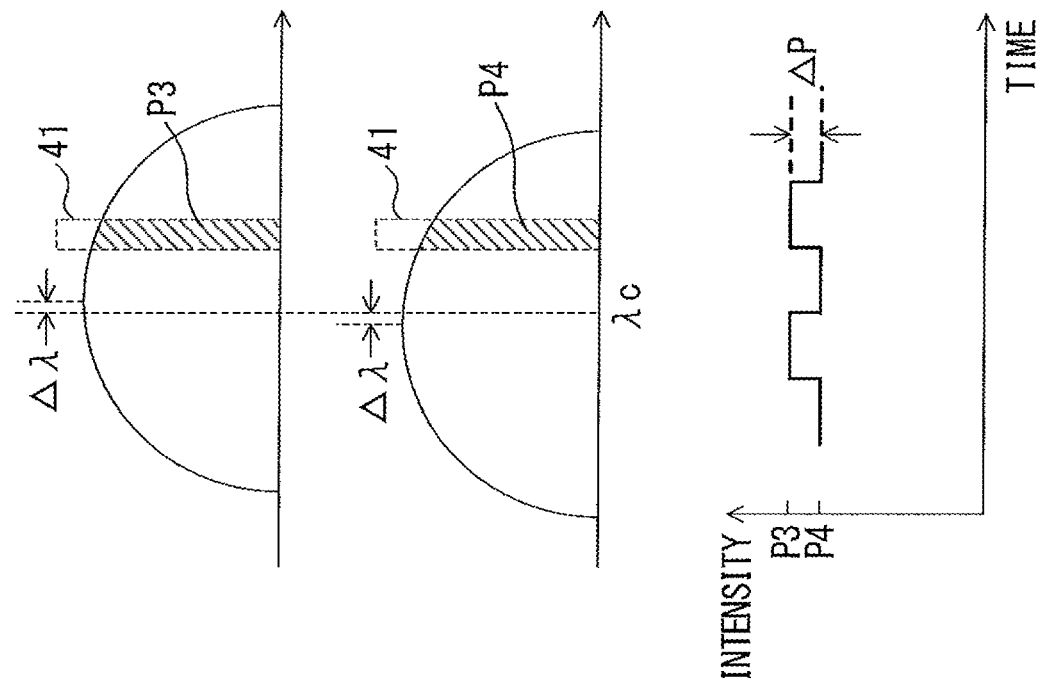
F I G. 7B
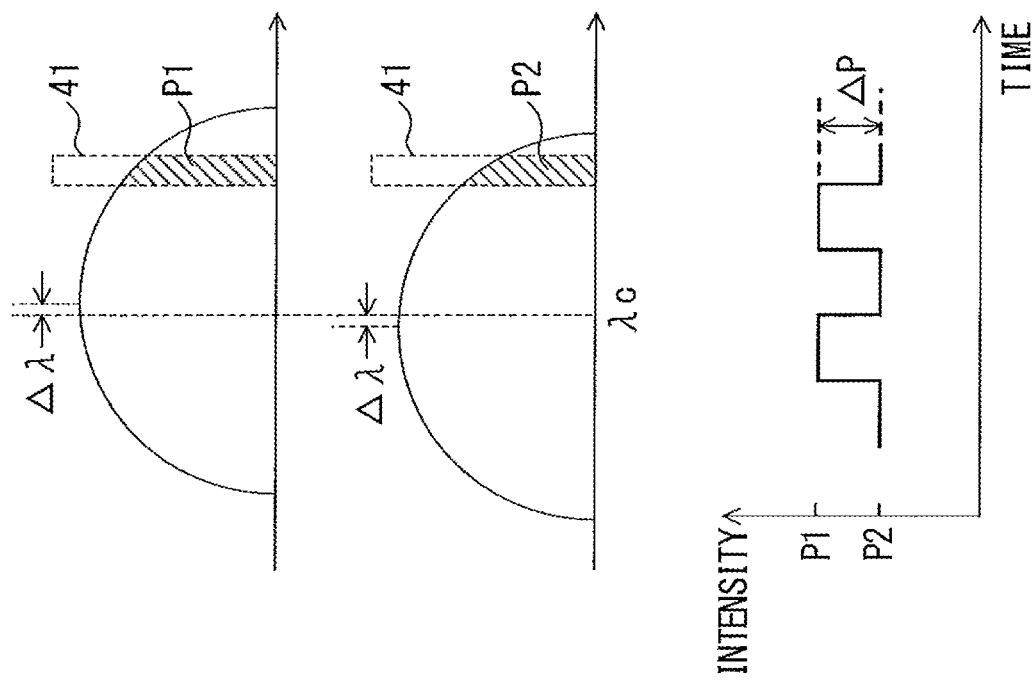
F I G. 7A

F I G. 1 2 A
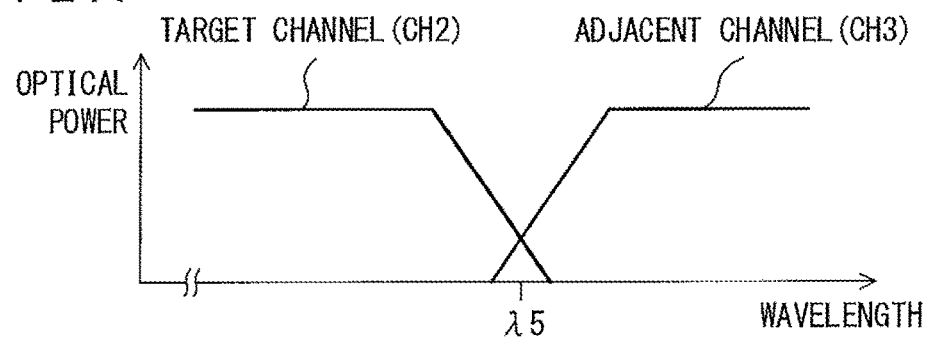
F I G. 1 2 B
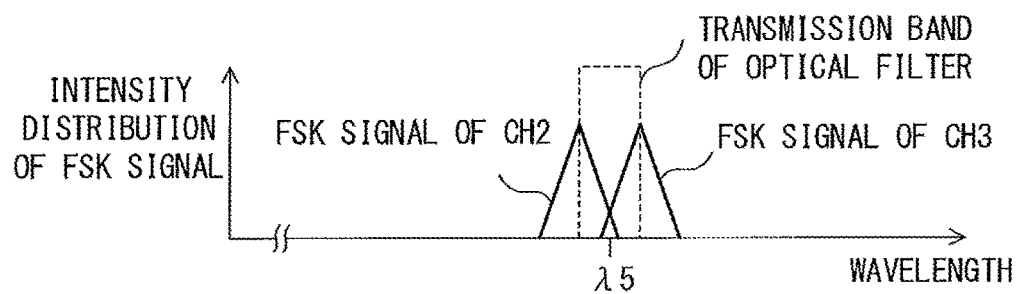
F I G. 1 2 C
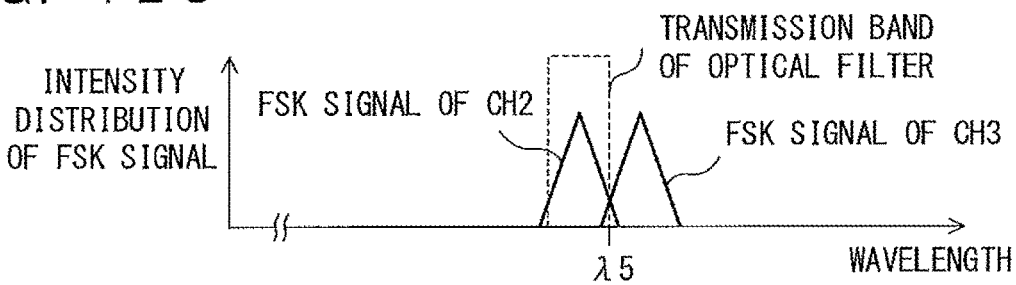

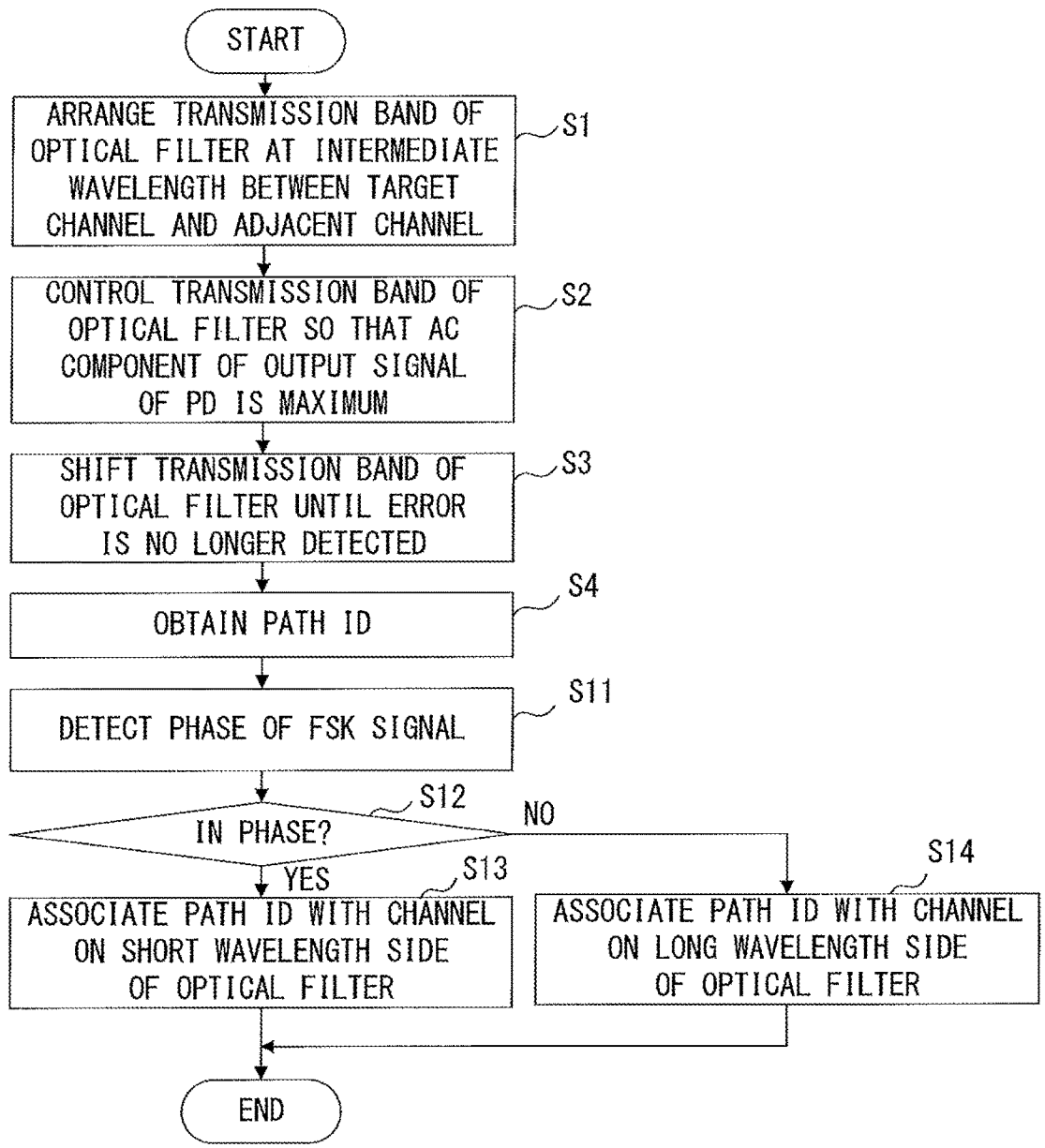
F I G. 1 5

OPTICAL RECEIVER THAT HAS FUNCTION TO DETECT SIGNAL SUPERIMPOSED ON OPTICAL SIGNAL AND METHOD FOR RECEIVING OPTICAL SIGNAL

CROSS-REFERENCE TO RELATED APPLICATION

This application is based upon and claims the benefit of priority of the prior Japanese Patent Application No. 2015-056231, filed on Mar. 19, 2015, the entire contents of which are incorporated herein by reference.

FIELD

The embodiments discussed herein are related to an optical receiver that has a function to detect a signal superimposed on an optical signal and a method for receiving an optical signal.

BACKGROUND

A photonic network having an optical add-drop multiplexer and/or a wavelength crossconnect has been proposed and developed. The optical add-drop multiplexer (ROADM: Reconfigurable Optical Add/Drop Multiplexer) is capable of dropping an optical signal of a desired wavelength from a WDM optical signal and guiding the dropped signal to a client, and is capable of adding a client signal of any wavelength to a WDM optical signal. The wavelength crossconnect (WXC: Wavelength Cross Connect or PXC: Photonic Cross Connect) is capable of controlling the route of an optical signal for each wavelength, without converting the optical signal into an electric signal.

In a photonic network as described above, a plurality of optical paths (here, wavelength paths) that use the same wavelength may be set. For this reason, in order to reliably establish and operate a network, for example, a scheme to superimpose a path ID to identify each optical path on an optical signal has been proposed. In this case, an optical node device (here, the optical add-drop multiplexer, the wavelength crossconnect and the like) has a function to detect the path ID superimposed on the optical signal. Accordingly, since each optical path can be identified with certainty at the optical node device, it becomes possible to monitor/detect/avoid a failure such as connecting the optical fiber to a wrong port, and so on.

For example, Japanese Laid-open Patent Publication No. 2013-9238 and Japanese Laid-open Patent Publication No. 2014-150447 disclose a configuration and a method for detecting a signal superimposed on an optical signal.

In a conventional WDM transmission system, wavelength channels are often arranged with a 100 GHz spacing or a 50 GHz spacing. These days, in order to increase a communication capacity, a method for decreasing a spacing with which wavelength channels are arranged is proposed. For example, a method for generating an optical signal of each wavelength channel by use of a Nyquist filter is proposed.

However, when a spacing with which wavelength channels are arranged is decreased, it is difficult to detect a signal superimposed on an optical signal of each wavelength channel. In other words, there is a possibility that a signal superimposed on an optical signal of a target wavelength channel will not be detected due to a signal being superimposed on an optical signal of an adjacent wavelength channel. Further, there is a possibility that a detection circuit will erroneously detect the signal superimposed on the optical signal of the wavelength channel that is adjacent to the target wavelength channel.

SUMMARY

According to an aspect of the invention, an optical receiver that receives a wavelength multiplexed optical signal including a plurality of wavelength channels, a superimposition signal being superimposed by frequency modulation on each of the wavelength channels, the optical receiver comprising: an optical filter that filters the wavelength multiplexed optical signal; a filter controller that controls a wavelength of a transmission band of the optical filter; a photo detector that generates an intensity signal representing a change in the intensity of an output light of the optical filter; an amplitude detector that detects an amplitude of the intensity signal output from the photo detector; an signal detector that detects, according to the intensity signal generated by the photo detector, a superimposition signal superimposed on a specified wavelength channel; and an error detector that detects an error in the superimposition signal detected by the signal detector. The filter controller controls the wavelength of the transmission band of the optical filter so that the amplitude of the intensity signal detected by the amplitude detector is larger, and then controls the wavelength of the transmission band of the optical filter so that the number of errors in the superimposition signal detected by the signal detector is reduced.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a transmission circuit of WDM transmission device;

FIG. 3 illustrates an example of a path ID signal;

FIG. 4A and FIG. 4B illustrate examples of optical transmitters;

FIG. 7A and FIG. 7B are diagrams that explain a method for detecting an FSK signal;

FIG. 12A to FIG. 12C illustrate an example of a control of a transmission band wavelength;

FIG. 15 is a flowchart that illustrates an example of a method for receiving an optical signal according to the second embodiment.

DESCRIPTION OF EMBODIMENTS

Figure 1:
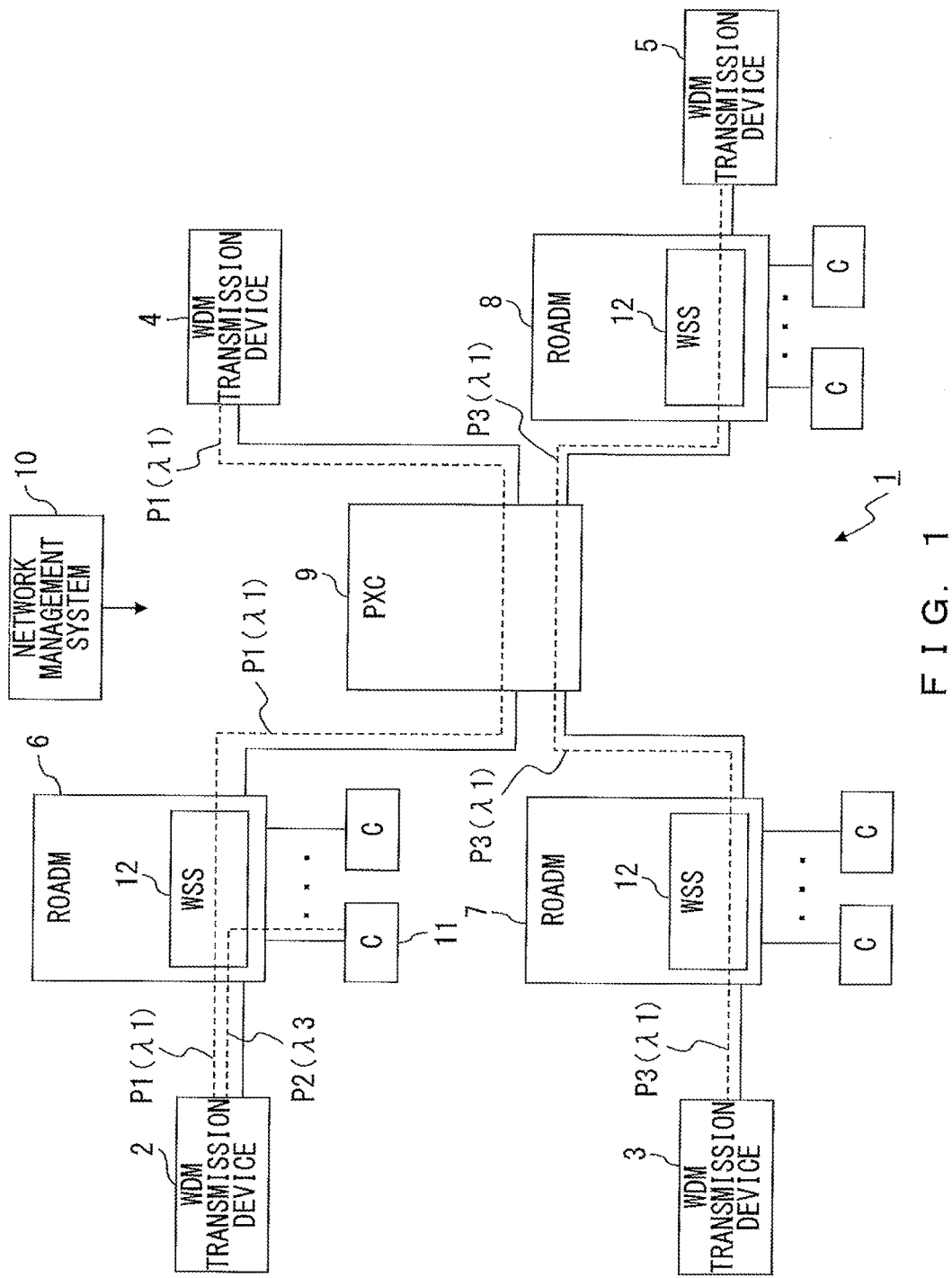
FIG. 1 illustrates an example of an optical transmission system.

FIG. 1 illustrates an example of an optical transmission system according to an embodiment of the present invention. An optical transmission system 1 illustrated in FIG. 1 has WDM transmission devices 2-5, optical add-drop multiplexers (ROADM: Reconfigurable Optical Add/Drop Multiplexer) 6-8, a photonic crossconnect (PXC: Photonic Cross Connect or WXC: Wavelength Cross Connect) 9, and a network management system (NMS) 10.

The WDM transmission devices 2, 3, 5 are connected to the optical add-drop multiplexers 6, 7, 8, respectively, via a corresponding optical fiber line. The optical add-drop multiplexers 6, 7, 8 are connected to the photonic crossconnect 9, respectively, via a corresponding optical fiber line. One or a plurality of optical amplifiers may be provided the optical fiber line.

Each of the WDM transmission devices 2-5 is able to transmit a WDM optical signal and to receive a WDM optical signal. A plurality of wavelength channels are multiplexed in a WDM optical signal. In other words, a WDM optical signal includes a plurality of optical signals of different wavelengths. Each of the optical add-drop multiplexers 6-8 has a wavelength selective switch (WSS) 12 and is able to process an optical signal for each wavelength channel. Each of the optical add-drop multiplexers 6-8 may drop an optical signal of a specified wavelength from a received WDM optical signal and guide the dropped signal to a client line. In addition, each of the optical add-drop multiplexers 6-8 may add an optical signal received from a client line to a WDM optical signal. The photonic crossconnect 9 has a plurality of input ports and a plurality of output ports, and guides a received optical signal to a corresponding output port so as to realize a specified optical path. The photonic crossconnect 9 may also have a function for dropping an optical signal from a WDM optical signal and for adding an optical signal to a WDM optical signal.

The network management system 10 manages the state of the optical transmission system 1 and controls the WDM transmission devices 2-5, the optical add-drop multiplexers 6-8 and the photonic crossconnect 9. For example, the network management system 10 controls the WDM transmission devices 2-5, the optical add-drop multiplexers 6-8 and the photonic crossconnect 9 so as to realize an optical path specified by a user.

In the example illustrated in FIG. 1, optical paths P1-P3 are established in the optical transmission system 1. Each optical path is indicated by a broken line. The optical path P1 carries an optical signal from the WDM transmission device 2 to the WDM transmission device 4 via the optical add-drop multiplexer 6 and the photonic crossconnect 9. The optical path P2 carries an optical signal from the WDM transmission device 2 to a client 11 via the optical add-drop multiplexer 6. The optical path P3 carries an optical signal from the WDM transmission device 3 to the WDM transmission device 5 via the optical add-drop multiplexer 7, the photonic crossconnect 9, and the optical add-drop multiplexer 8. Each of the optical paths P1-P3 may carry an optical signal in both directions.

In the optical transmission system. 1 having the above described configuration, the network management system 10 may assign the same wavelength to different optical paths, to utilize the communication resource efficiently or flexibly. In the example illustrated in FIG. 1, wavelengths λ1, λ3, λ1, are assigned to the optical paths P1, P2, P3, respectively.

The user or the network administrator may wish to check whether the optical paths are correctly established. However, when the same wavelength is assigned to a plurality of optical paths, it is difficult to identify each optical path just by monitoring the spectrum of each wavelength channel. For example, at the photonic crossconnect 9, it is difficult to identify the optical paths P1, P3 just by monitoring the spectrum of each wavelength channel.

Therefore, the network management system 10 assigns a path ID to each optical path. Then a source device of an optical path superimposes a path ID signal that represents the path ID on an optical signal to be transmitted via the optical path. For example, the WDM transmission device 2 superimposes a path ID signal that represents "path ID=1" on an optical signal to be transmitted via the optical path P1, and superimposes a path ID signal that represents "path ID=2" on an optical signal to be transmitted via the optical path 2.

Each optical transmission device (WDM transmission devices 2-5, ROADMs 6-8 and the photonic crossconnect 9 in FIG. 1) has a signal detection circuit to detect the path ID signal superimposed on the optical signal and to obtain the path ID. However, the signal detection circuit does not have to be provided for all of the WDM transmission devices. Further, a plurality of signal detection circuits may be provided for one optical transmission device. In addition, the signal detection circuit may be implemented within the optical transmission device, or may be connected to the optical transmission device.

FIG. 2 illustrates an example of a transmission circuit of WDM transmission device. As illustrated in FIG. 2, a WDM transmission circuit 20 has optical transmitters 21-1 through 21-$n$ and a multiplexer 22. The WDM transmission circuit 20 is provided in, for example, each of the WDM transmission devices 2-5.

Each of the optical transmitters 21-1 through 21-$n$ generates an optical signal by modulating carrier light by an input data sequence. Here, wavelengths λ1 through λn (that is, optical frequencies f1 through fn) of the carrier light that the optical transmitters 21-1 through 21-$n$ use are different from each other. To the optical transmitters 21-1 through 21-$n$, a path ID that identifies an optical path is given by the network management system 10. The path ID is given to the corresponding optical transmitters 21-1 through 21-$n$ as a path ID signal. The path ID signal is, for example, a code of a specified length.

In this embodiment, the path ID signal is transmitted using a frame of a specified length. This frame includes a preamble, a payload, and an error detection code, as illustrated in FIG. 3. The preamble is formed in a specified bit pattern. It is assumed that the bit pattern of the preamble is the same in all path ID signals. Further, in an optical receiver that receives a path ID signal, the preamble is used as synchronization information to detect the beginning of the path ID signal. The payload stores therein information that identifies an optical path (that is, a path ID). However, the payload may store therein other information (for example, information that identifies a start point node of an optical path and information that indicates a route of the optical path). The error detection code is added after the payload to detect a bit error of the payload. Instead of the error detection code, an error correction code may be added after the payload. The path ID signal may be periodically transmitted.

The optical transmitters 21-1 through 21-*n* respectively superimpose the path ID signal on the optical signal by frequency modulation. In other words, the optical transmitters 21-1 through 21-*n* respectively output an optical signal on which the path ID signal is superimposed by frequency modulation. The path ID signal is an example of a frequency modulated signal. The multiplexer 22 multiplexes optical signals output from the optical transmitters 21-1 through 21-*n* to generate a WDM optical signal. Accordingly, the WDM transmission circuit 20 transmits a WDM optical signal including a plurality of wavelength channels on each of which a frequency modulated signal (that is, a path ID signal) is superimposed.

The modulation schemes of the data sequence by the optical transmitters 21-1 through 21-*n* do not have to be the same as each other. For example, the optical transmitter 21-1 may transmit a QPSK modulated optical signal, while the optical transmitter 21-2 may transmit a 16QAM modulated optical signal. In addition, the symbol rates or the bit rates of optical signals output from the optical transmitters 21-1 through 21-*n* do not have to be the same as each other.

FIG. 4A and FIG. 4B illustrate the configurations of optical transmitters having a function to superimpose a path ID signal. The optical transmitters illustrated in FIG. 4A and FIG. 4B are examples of the optical transmitters 21-1 through 21-*n* illustrated in FIG. 2. However, the configuration to superimpose a path ID signal on an optical signal by frequency modulation is not limited to the configurations or the methods illustrated in FIG. 4A and FIG. 4B.

The optical transmitter illustrated in FIG. 4A has a frequency tunable laser light source 31 and an optical modulator 32. The frequency tunable laser light source 31 generates continuous wave light of an oscillation frequency that is based on a frequency control signal. Therefore, by giving the path ID signal as a frequency control signal, the frequency tunable laser light source 31 generates continuous wave light of an oscillation frequency according to the path ID signal. The optical modulator 32 modulates the continuous wave light generated by the frequency tunable laser light source 31 by the data sequence. As a result, an optical signal on which the path ID signal is superimposed by frequency modulation is generated.

The optical transmitter illustrated in FIG. 4B provides the frequency modulation superimposition by performing digital signal processing. A mapping circuit 33 maps the data sequence into an I component data sequence and a Q component data sequence. An integrator circuit 34 integrates the path ID signal. In the example illustrated in FIG. 4B, a path ID signal f(t) is a digital data sequence representing an amplitude-time waveform of a path ID code. Then, the integrator circuit 34 outputs phase information $\theta(t)$ described below.

$$\theta(t) = \int 2\pi f(t) dt$$

A mod $2\pi$ circuit 35 converts the output value of the integrator circuit 34 into a value within a range from zero to $2\pi$. However, when the value range of the integrator circuit 34 is designed to be from zero to $2\pi$, the mod $2\pi$ circuit 35 may be omitted.

A rotation operation circuit 36 rotates a set of the I component data sequence and the Q component data sequence using the phase information $\theta(t)$ by the operation below, where I and Q are input data of the rotation operation circuit 36 and I_out and Q_out are output data of the rotation operation circuit 36.

$$I\_out = I \cos \theta(t) - Q \sin \theta(t)$$

$$Q\_out = I \sin \theta(t) + Q \cos \theta(t)$$

The data I_out and the data Q_out obtained by the rotation operation circuit 36 are respectively converted into an analog signal by D/A converters 37 and given to an optical modulator 38. The optical modulator 38 generates a modulated optical signal by modulating the continuous wave light output from the laser light source 39 by the data I_out and the data Q_out. As a result, an optical signal on which the path ID signal is superimposed by frequency modulation is generated.

Figure 5:
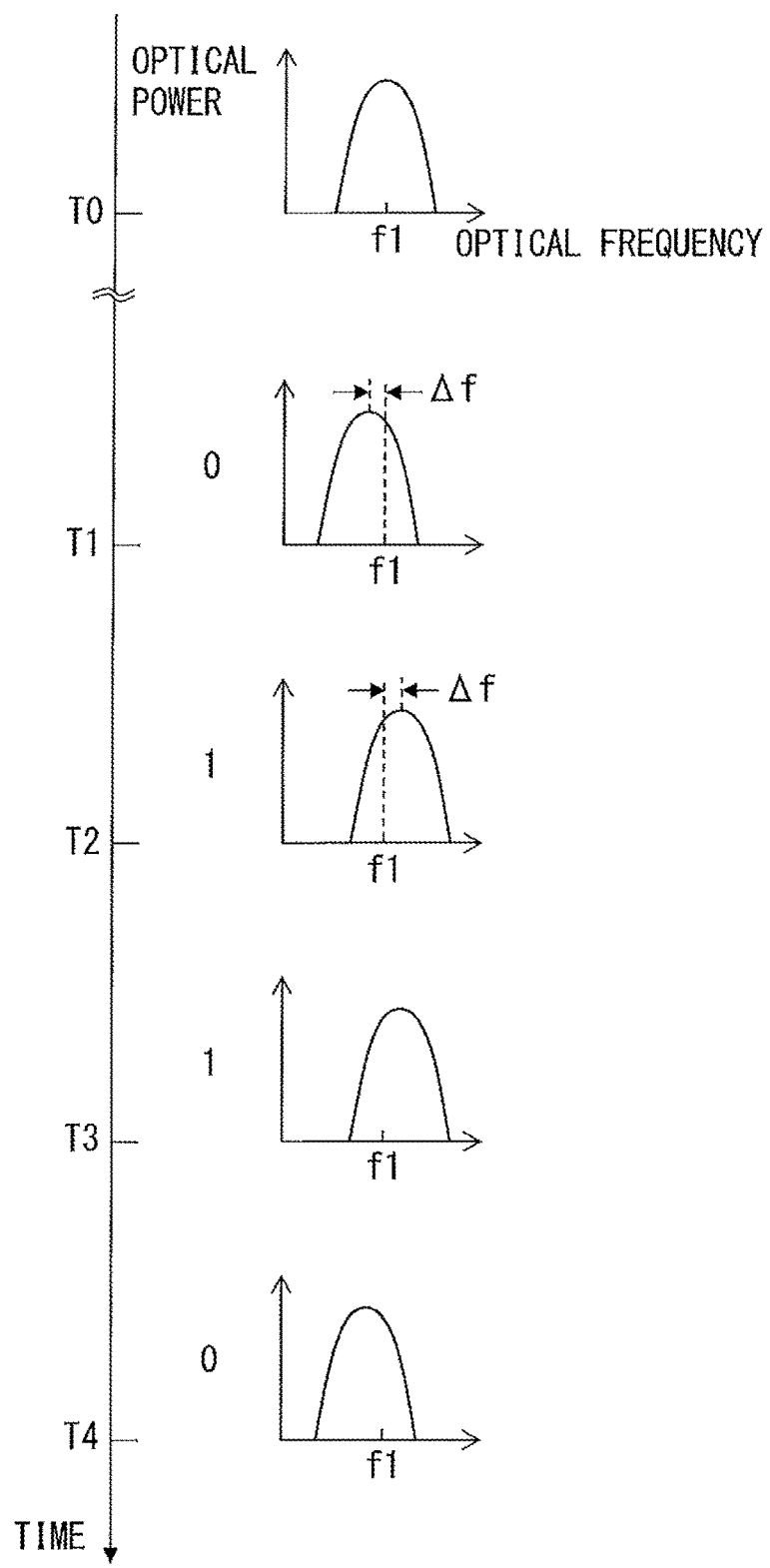
FIG. 5 is a diagram that explains frequency modulation superimposition.

FIG. 5 is a diagram that explains frequency modulation superimposition. FIG. 5 illustrates the time-resolved output spectrum of the optical transmitter at time T0-T4. An optical spectrum at each time spreads according to the modulation by the data sequence. In other words, the width and the shape of an optical spectrum depend on the modulation scheme and the modulation speed of an optical signal.

On the optical signal output from the optical transmitter, as explained with reference to FIG. 2 to FIG. 4B, the path ID signal is superimposed by frequency modulation. In the example illustrated in FIG. 5, the path ID signal is a digital code, and the path ID code superimposed on the optical signal at the time T1-T4 is "0110". In addition, the center frequency of carrier light used by the optical transmitter is f1.

At the time T0, the path ID code is not superimposed on the optical signal. In this case, the optical transmitter does not shift the frequency of the optical signal. Therefore, the center frequency of the spectrum of the optical signal output at the time T0 is f1.

At the time T1, "0" is superimposed on the optical signal. In this case, in this embodiment, the optical transmitter shifts the frequency of the optical signal by $-\Delta f$. Therefore, the center frequency of the spectrum of the optical signal output at the time T1 is f1$-\Delta f$.

At the time T2, "1" is superimposed on the optical signal. In this case, in this embodiment, the optical transmitter shifts the frequency of the optical signal by $+\Delta f$. Therefore, the center frequency of the spectrum of the optical signal output at the time T2 is f1$+\Delta f$. Similarly, the center frequency of the spectrum of the optical signal output at the T3 is f1$+\Delta f$, and the center frequency of the spectrum of the optical signal output at the time T4 is f1$-\Delta f$.

$\Delta f$ is sufficiently small compared with the frequency of the carrier light. In addition, $\Delta f$ is determined to avoid ICI (inter channel interference) in the WDM transmission system. For example, in a WDM transmission system in which the wavelength channel is arranged on the 50 GHz/100 GHz frequency grid recommended by ITU-T, an appropriate $\Delta f$ is about 1 MHz-1 GHz, although this is not a particular limitation. When $\Delta f$ is too small, the frequency fluctuation (laser line width) of the carrier light becomes nonnegligible as noise, and the detection sensitivity of the superimposed signal becomes low. Therefore, it is preferable to determine $\Delta f$ in consideration of the interference with adjacent channels and the detection sensitivity.

While the frequency shift when the superimposed signal is "0" and "1" is "$-\Delta f$" and "$+\Delta f$" respectively in the example illustrated in FIG. 5, the present embodiment is not limited to this scheme. For example, the frequency shift when the superimposed signal is "0" and "1" may be "$+\Delta f$"

and "−Δf", respectively. In addition, the frequency shift may be zero when the superimposed signal is "0 (or, 1)", and the optical frequency may be shifted when the superimposed signal is "1 (or, 0)". Further, in 4-level frequency shift keying, for example, the frequency shifts "−Δf", "−0.5Δf", "+0.5 Δf" and "+Δf" may be allocated to the 2-bit superimposed signals "00", "01", "10" and "11", respectively. Furthermore, the superimposed signal may be modulated using multi-level frequency shift keying other than binary or 4-level.

While the path ID signal is a digital signal in the examples illustrated in FIG. 4A and FIG. 4B, the method to shift the optical frequency is substantially the same in the case in which the path ID signal is an analog signal. However, when the path ID signal is an analog signal, the amount of frequency shift changes continuously, not discretely.

Figure 6:
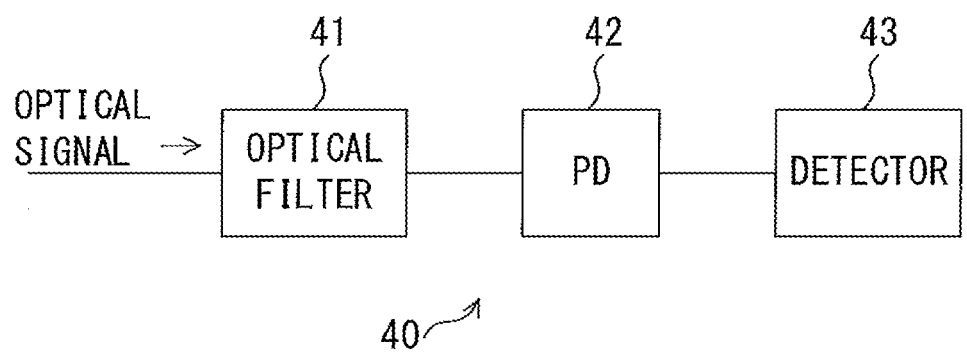
FIG. 6 illustrates an example of a circuit that detects an FSK signal.

FIG. 6 illustrates an example of a circuit that detects a frequency modulated signal. The frequency modulated signal superimposed on an optical signal may be hereinafter referred to as an "FSK (Frequency Shift Keying) signal". Note that the path ID signal is an example of the FSK signal.

An FSK signal detection circuit 40 that detects an FSK signal from an optical signal includes an optical filter 41, a photo detector 42, and a detector 43. A received optical signal is guided to the optical filter 41. The photo detector 42 converts the received optical signal filtered by the optical filter 41 into an electric signal. The detector 43 detects an FSK signal according to the output signal of the photo detector 42. A circuit that removes a DC component (for example, a capacitor) may be provided between the photo detector 42 and the detector 43.

As described above, an FSK signal is superimposed on an optical signal input to the FSK signal detection circuit 40. Therefore, as illustrated in FIG. 7A and FIG. 7B, the center wavelength of the optical signal varies between $\lambda c-\Delta\lambda$ and $\lambda c+\Delta\lambda$ according to the FSK signal. FIG. 7A and FIG. 7B illustrate the spectrum of the optical signal of a certain wavelength channel in a WDM optical signal and the transmission band (or pass band) of the optical filter 41. The wavelength $\lambda c$ illustrated in FIG. 7A and FIG. 7B corresponds to the frequency f1 illustrated in FIG. 5.

The width of the transmission band of the optical filter 41 is narrower than that of the spectrum of the optical signal. Further, the transmission of the optical filter 41 is arranged, at a wavelength shifted by a specified offset, on the long wavelength side or the short wavelength side with respect to the center wavelength $\lambda c$ of the optical signal. In the examples illustrated in FIGS. 7A and 7B, the transmission band of the optical filter 41 is arranged on the long wavelength side with respect to the center wavelength $\lambda c$ of the optical signal. Therefore, the optical filter 41 extracts some of the components in the spectrum of the received optical signal.

The photo detector 42 converts the output light of the optical filter 41 (that is, the optical signal filtered by the optical filter 41) into an electric signal. The electric signal represents the power of the output light of the optical filter 41. Here, the power of the output light of the optical filter 41 is represented by the areas of a shaded portion illustrated in FIG. 7A and FIG. 7B. In other words, in the case of FIG. 7A, the power of the output light of the optical filter 41 is represented by P1 when the center wavelength of the optical signal is $\lambda c+\Delta\lambda$, and is represented by P2 when the center wavelength of the optical signal is $\lambda c-\Delta\lambda$. As described above, the FSK signal superimposed on the optical signal is converted by the optical filter 41 and the photo detector 42 into an intensity signal (or an intensity modulated signal) that represents a change in optical intensity. In this case, an amplitude ΔP of the intensity signal corresponds to the difference between the power P1 of the output light of the optical filter 41 when the center wavelength of the optical signal is $\lambda c+\Delta\lambda$ and the power P2 of the output light of the optical filter 41 when the center wavelength of the optical signal is $\lambda c-\Delta\lambda$.

In the case of FIG. 7B, the power of the output light of the optical filter 41 is represented by P3 when the center wavelength of the optical signal is $\lambda c+\Delta\lambda$, and is represented by P4 when the center wavelength of the optical signal is $\lambda c-\Delta\lambda$. In this case, the amplitude ΔP of the intensity signal corresponds to the difference between the power P3 and the power P4.

As described above, the amplitude of an intensity signal generated by the optical filter 41 and the photo detector 42 depends on a wavelength at which the transmission band of the optical filter 41 is arranged with respect to the spectrum of an optical signal. Specifically, when the transmission band of the optical filter 41 is arranged in a wavelength range in which the slope of the spectrum of an optical signal is steep, the amplitude of an intensity signal generated by the optical filter 41 and the photo detector 42 is large. On the other hand, when the transmission band of the optical filter 41 is arranged in a wavelength range in which the slope of the spectrum of the optical signal is gradual, the amplitude of the intensity signal is small.

The operating speed of the photo detector 42 is sufficiently low with respect to a symbol rate of a data signal. In this case, data signal components are averaged by the photo detector 42, and an intensity signal corresponding to an FSK signal is guided to the detector 43. Note that a low pass filter that removes data signal components may be implemented on the input side or on the output side of the photo detector 42. In addition, a capacitor that removes a DC component may be implemented between the photo detector 42 and the detector 43.

The detector 43 detects an FSK signal according to the intensity signal generated by the optical filter 41 and the photo detector 42. Specifically, the detector 43 decides each bit of the FSK signal by comparing the intensity signal with a specified threshold. For example, when the intensity signal is greater than the threshold, the FSK signal is decided to be "1", and when the intensity signal is not greater than the threshold, the FSK signal is decided to be "0".

Therefore, the detection sensitivity of an FSK signal depends on the amplitude of an intensity signal. Specifically, the detection sensitivity of an FSK signal is high when the amplitude of the intensity signal is large, and the detection sensitivity of an FSK signal is low when the amplitude of the intensity signal is small. Therefore, the FSK signal detection circuit 40 preferably includes a function that controls the wavelength of the transmission band of the optical filter 41 so that the amplitude of the intensity signal generated by the optical filter 41 and the photo detector 42 is large.

As described above, the FSK signal detection circuit 40 is able to detect an FSK signal superimposed on an optical signal using the optical filter 41. Therefore, when a path ID signal is superimposed by frequency modulation on an optical signal, the FSK signal detection circuit 40 is able to detect the path ID signal.

Figure 8:
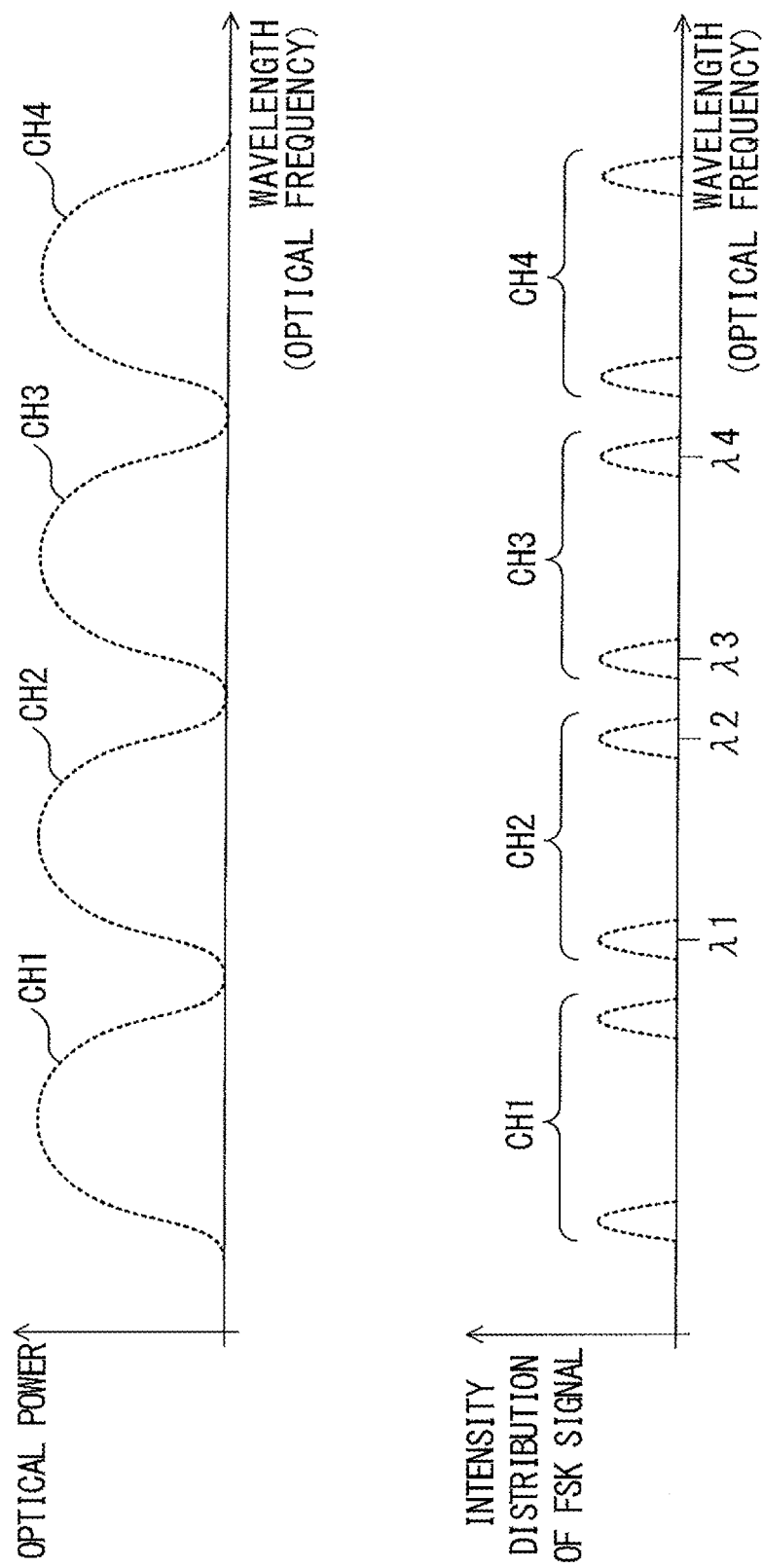
FIG. 8 illustrates a method for detecting an FSK signal from a desired wavelength channel.

FIG. 8 illustrates a method for detecting an FSK signal from a desired wavelength channel. In the example illustrated in FIG. 8, wavelength channels CH1-CH4 are multiplexed in a WDM optical signal. Further, an FSK signal is superimposed on an optical signal of each wavelength channel.

An intensity distribution of the FSK signal illustrated in FIG. 8 represents the amplitude (or the power) of an intensity signal generated by the optical filter 41 and the photo detector 42. Here, as described with reference to FIG. 7A and FIG. 7B, when the transmission band is arranged in a wavelength range in which the slope of the spectrum of an optical signal is steep, the amplitude of the intensity signal (that is, intensity of the FSK signal component to be detected) is large. In other words, as illustrated in FIG. 8, an intensity of the FSK signal component to be detected is high in a wavelength range in which the slope of an optical power spectrum of each wavelength channel is steep.

Therefore, for example, when the FSK signal detection circuit 40 detects an FSK signal superimposed on the wavelength channel CH2, the transmission band of the optical filter 41 is arranged at $\lambda 1$ or $\lambda 2$. Likewise, when the FSK signal detection circuit 40 detects an FSK signal superimposed on the wavelength channel CH3, the transmission band of the optical filter 41 is arranged at $\lambda 3$ or $\lambda 4$. It is assumed that the FSK signal detection circuit 40 has a function that detects a wavelength at which the intensity of an FSK signal component reaches a peak, by monitoring the amplitude of the output signal of the photo detector 42 while sweeping the wavelength of the transmission band of the optical filter 41. A wavelength of each of the wavelength channels CH1-CH4 is known. Therefore, the FSK signal detection circuit 40 can detect an FSK signal superimposed on a desired wavelength channel by controlling the wavelength of the transmission band of the optical filter 41 so that the amplitude of the output signal of the photo detector 42 reaches a peak.

In recent years, a technology for increasing a transmission capacity of a WDM optical signal by decreasing a spacing with which wavelength channels are arranged has been investigated. For example, a wavelength spacing in WDM can be decreased by making the slope of the spectrum of an optical signal steeper by use of a Nyquist filter.

Figure 9:
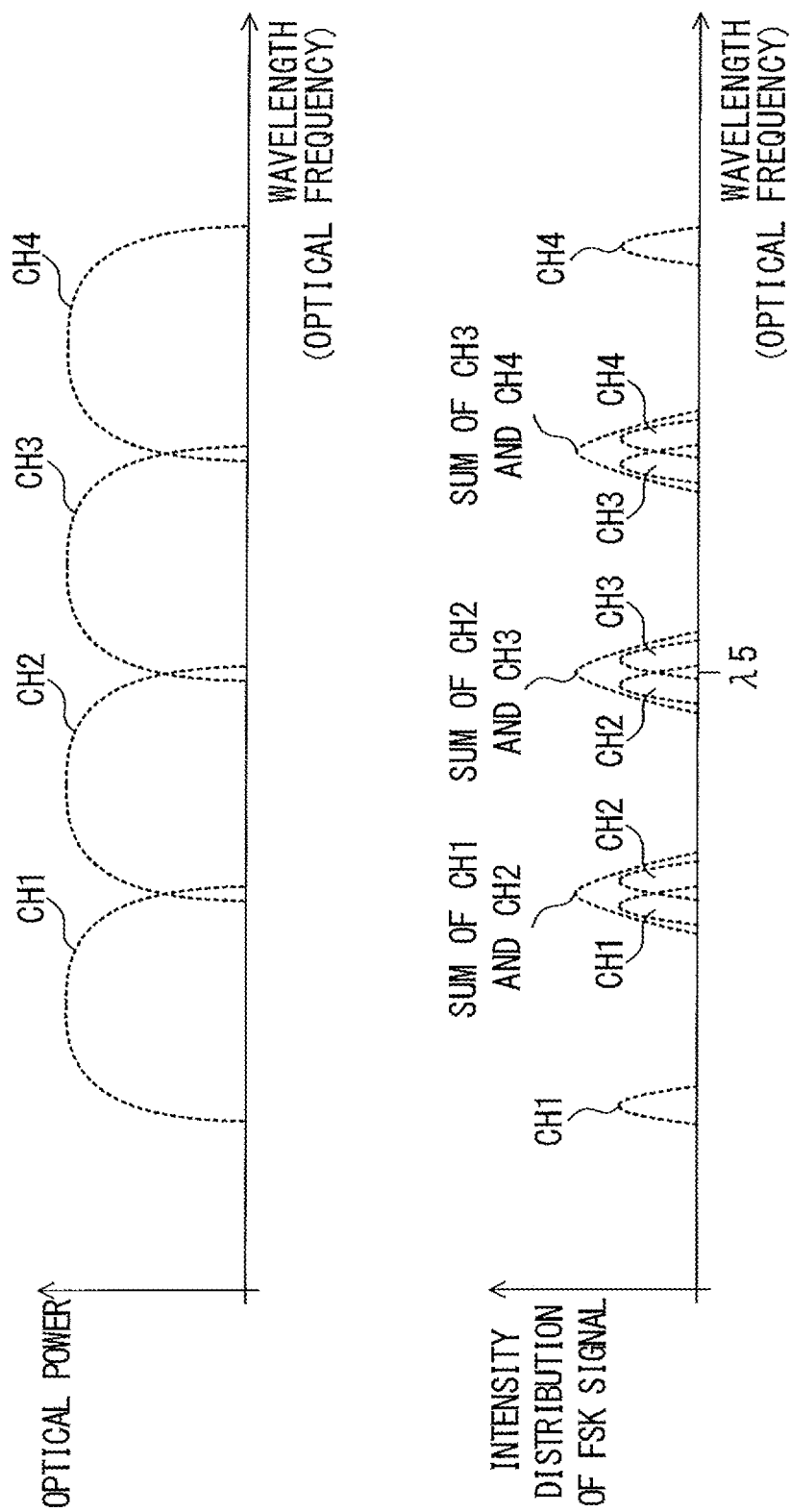
FIG. 9 is a diagram that explains a problem in a system in which a wavelength spacing in WDM is narrow.

However, in a transmission system in which a wavelength spacing in WDM is narrow, a wavelength range in which an FSK signal of a certain wavelength channel is detected is close to a wavelength range in which an FSK signal of an adjacent wavelength channel is detected. For example, as illustrated in FIG. 9, a wavelength range in which an FSK signal is detected on the long wavelength side of the wavelength channel CH2 overlaps a wavelength range in which an FSK signal is detected on the short wavelength side of the wavelength channel CH3.

Here, as described above, the FSK signal detection circuit 40 searches for an FSK signal superimposed on a desired wavelength channel by controlling the wavelength of the transmission band of the optical filter 41 so that the amplitude of the output signal of the photo detector 42 reaches a peak. Therefore, for example, when detecting the FSK signal superimposed on the wavelength channel CH2 illustrated in FIG. 9, the wavelength of the transmission of the optical filter 41 may be controlled so as to be maintained at $\lambda 5$. However, the peak obtained at $\lambda 5$ is generated by a sum of an intensity signal component due to the FSK signal superimposed on the wavelength channel CH2 and an intensity signal component due to the FSK signal superimposed on the wavelength channel CH3. In other words, it is difficult to separate, at $\lambda 5$, the FSK signal superimposed on the wavelength channel CH2 and the FSK signal superimposed on the wavelength channel CH3 from each other. Therefore, the FSK signal detection circuit 40 may not be able to detect the FSK signal superimposed on the wavelength channel CH2 even when controlling the wavelength of the transmission band of the optical filter 41 so that the amplitude of the output signal of the photo detector 42 reaches a peak (in other words, even when the wavelength of the transmission band of the optical filter 41 is controlled so as to be maintained at $\lambda 5$).

This problem may be solved by making a width of the transmission band of the optical filter 41 narrower. However, when a width of the transmission band of the optical filter 41 is made narrower, the intensity of the light output from the optical filter 41 becomes lower, which results in reducing the detection sensitivity of an FSK signal.

First Embodiment

Figure 10:
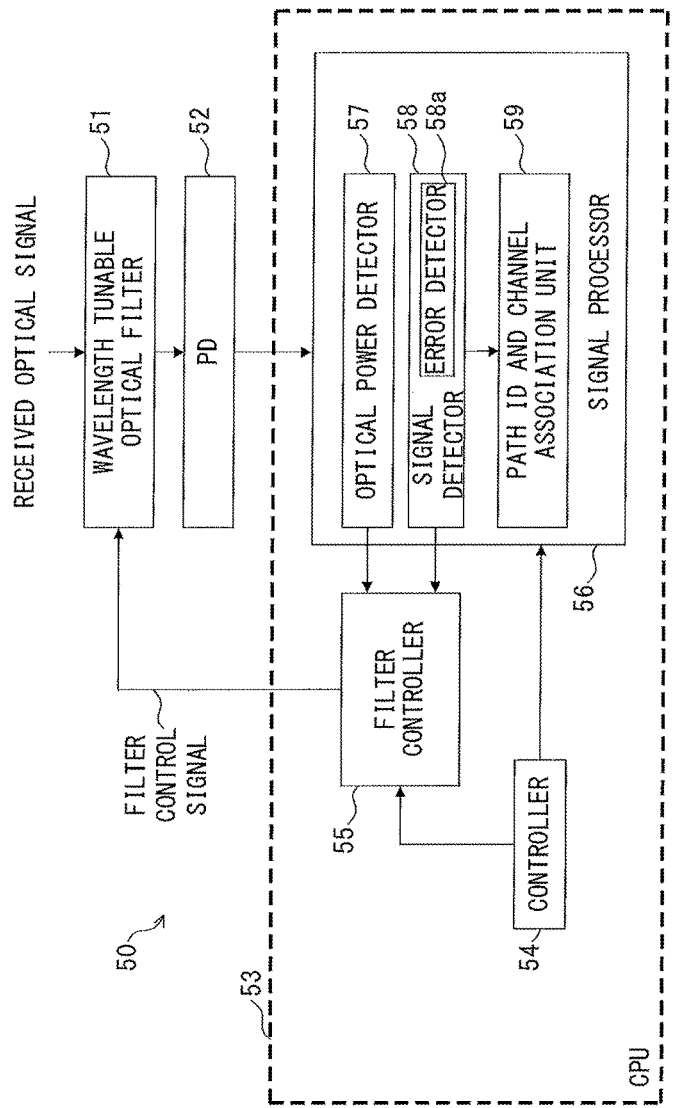
FIG. 10 illustrates an example of an optical receiver according to a first embodiment.

FIG. 10 illustrates an example of an optical receiver according to a first embodiment of the present invention. An optical receiver 50 according to the first embodiment detects an FSK signal superimposed on a desired wavelength channel in a WDM optical signal. In this example, the FSK signal is a path ID signal superimposed by frequency modulation on an optical signal that transmits main data. That is, the path ID signal is an example of a superimposition signal superimposed by frequency modulation on each of the plurality of wavelength channels. As illustrated in FIG. 3, the path ID signal includes a preamble, a payload, and an error detection code. The payload stores therein information that identifies an optical path (that is, a path ID). As illustrated in FIG. 10, the optical receiver 50 includes a wavelength tunable optical filter 51, a photo detector (PD) 52, and a CPU 53.

A received WDM optical signal is input to the wavelength tunable optical filter 51. The wavelength of the transmission band of the wavelength tunable optical filter 51 is controlled by a filter control signal generated by the CPU 53. At this point, as described with reference to FIG. 7A to FIG. 9, the wavelength of the transmission band of the wavelength tunable optical filter 51 is controlled so as to be maintained in a wavelength range in which the slope of the optical spectrum of a desired wavelength channel is steep. In the following description, a wavelength channel in which an FSK signal is to be detected may be referred to as a "target channel". The target channel is specified by, for example, a user or a network administrator. The width of the transmission band of the wavelength tunable optical filter 51 is narrower than that of the spectrum of the optical signal of each wavelength channel.

The photo detector 52 converts a received optical signal filtered by the wavelength tunable optical filter 51 into an electric signal. The electric signal represents the power of the output light of the wavelength tunable optical filter 51. Therefore, as described with reference to FIG. 7A and FIG. 7B, an FSK signal superimposed on an optical signal is converted by the wavelength tunable optical filter 51 and the photo detector 52 into a signal that represents a change in optical power. In other words, the FSK signal is converted into an intensity signal (or an intensity modulated signal). The operating speed of the photo detector 52 is sufficiently low with respect to a symbol rate of a main data signal carried by the optical signal. In this case, the main data signal components are averaged by the photo detector 52, so a change in intensity signal represents the FSK signal.

The intensity signal generated by the wavelength tunable optical filter 51 and the photo detector 52 is given to the CPU 53. In this case, a capacitor that removes a DC component and an A/D (Analog-to-Digital) converter are provided between the photo detector 52 and the CPU 53. In other words, a digital signal that represents an AC component of the intensity signal is given to the CPU 53. The A/D converter may be implemented in the CPU 53.

The CPU 53 includes a controller 54, a filter controller 55, and a signal processor 56. The CPU 53 detects an FSK signal according to the intensity signal generated by the wavelength tunable optical filter 51 and the photo detector 52, and identifies a path ID from the FSK signal.

The controller 54 controls the filter controller 55 and the signal processor 56 in the processing of detecting a path ID of a target channel. Specifically, when an instruction to detect a path ID of a certain channel (that is, a target channel) is given to the CPU 53, the controller 54 gives, to the filter controller 55, wavelength information indicating an initial wavelength that corresponds to the wavelength of the target channel. Further, the controller 54 gives, to the signal processor 56, a channel ID that identifies the target channel.

The filter controller 55 generates a filter control signal according to the instruction given by the controller 54 or the signal processor 56. The filter control signal specifies a center wavelength of the transmission band of the wavelength tunable optical filter 51.

The signal processor 56 includes an optical power detector 57, a signal detector 58, and a path ID and channel association unit 59. The signal processor 56 gives an instruction to the filter controller 55 according to the change in the power of the output light of the wavelength tunable optical filter 51. Further, the signal processor 56 detects the path ID signal of the target channel according to the change in the power of the output light of the wavelength tunable optical filter 51.

The optical power detector 57 detects the power of the output light of the wavelength tunable optical filter 51 according to the intensity signal generated by the wavelength tunable optical filter 51 and the photo detector 52. At this point, the optical power detector 57 detects the amplitude of the intensity signal. The amplitude of the intensity signal represents the magnitude of the change in the power of the output light of the wavelength tunable optical filter 51 (that is, the intensity of an AC component). Then, the optical power detector 57 generates an instruction for making the amplitude of the intensity signal larger and gives the instruction to the filter controller 55. This instruction is related to the control of the wavelength of the transmission band of the wavelength tunable optical filter 51.

The signal detector 58 detects an FSK signal superimposed on the target channel according to the intensity signal generated by the wavelength tunable optical filter 51 and the photo detector 52. For example, when the FSK signal transmits binary data, the signal detector 58 decides a value of each bit by comparing the intensity signal with a threshold. In other words, when the intensity signal is higher than the threshold, "1" is recovered, and when the intensity signal is lower than the threshold, "0" is recovered. As a result, the FSK signal is recovered.

The signal detector 58 includes an error detector 58a. Alternatively, the error detector 58a may be provided outside the signal detector 58. The error detector 58a is able to detect a bit error in an FSK signal. Here, in this embodiment, the path ID signal illustrated in FIG. 3 is superimposed on a corresponding wavelength channel as an FSK signal. Therefore, the error detector 58a detects an error in the path ID signal using an error detection code. At this point, the error detector 58a counts the number of errors in the path ID signal using the error detection code. Alternatively, the error detector 58a may monitor the error rate of the path ID signal using the error detection code. Then, the signal detector 58 generates an instruction for reducing the number of errors in the path ID signal and gives the instruction to the filter controller 55. This instruction is also related to the control of the wavelength of the transmission band of the wavelength tunable optical filter 51.

When an error in the path ID signal is no longer detected by the error detector 58a, the path ID and channel association unit 59 obtains a path ID stored in the payload of the path ID signal recovered by the signal detector 58. Then, the path ID and channel association unit 59 associates the obtained path ID with the target channel. Specifically, the path ID and channel association unit 59 associates the channel ID identifying the target channel that is reported from the controller 54 with the path ID detected from the received optical signal, and stores them in a memory. This memory may be implemented in the CPU 53, and is used for managing a path ID of each wavelength channel.

Upon receiving an instruction for making the amplitude of the intensity signal larger from the optical power detector 57, the filter controller 55 controls the center wavelength of the transmission band of the wavelength tunable optical filter 51 according to the instruction. This feedback control is repeatedly performed until the amplitude of the intensity signal reaches a peak. According to this feedback, the center wavelength of the transmission band of the wavelength tunable optical filter 51 is controlled so that the amplitude of the intensity signal reaches a peak. For example, when the wavelength channel CH2 illustrated in FIG. 9 is a target channel, the center wavelength of the transmission band of the wavelength tunable optical filter 51 is controlled so as to be maintained at $\lambda 5$.

Further, upon receiving an instruction for reducing the number of errors in a path ID signal from the signal detector 58, the filter controller 55 controls the center wavelength of the transmission band of the wavelength tunable optical filter 51 according to the instruction. This feedback control is repeatedly performed until an error in the path ID signal is no longer detected. According to this feedback, the center wavelength of the transmission band of the wavelength tunable optical filter 51 is controlled so that an error in the path ID signal is no longer detected.

After that, the path ID and channel association unit 59 obtains a path ID from the payload of the reproduced path ID signal. At this point, the path ID signal does not include an error. Therefore, the optical receiver 50 is able to correctly obtain a path ID allocated to the target channel.

Figure 11:
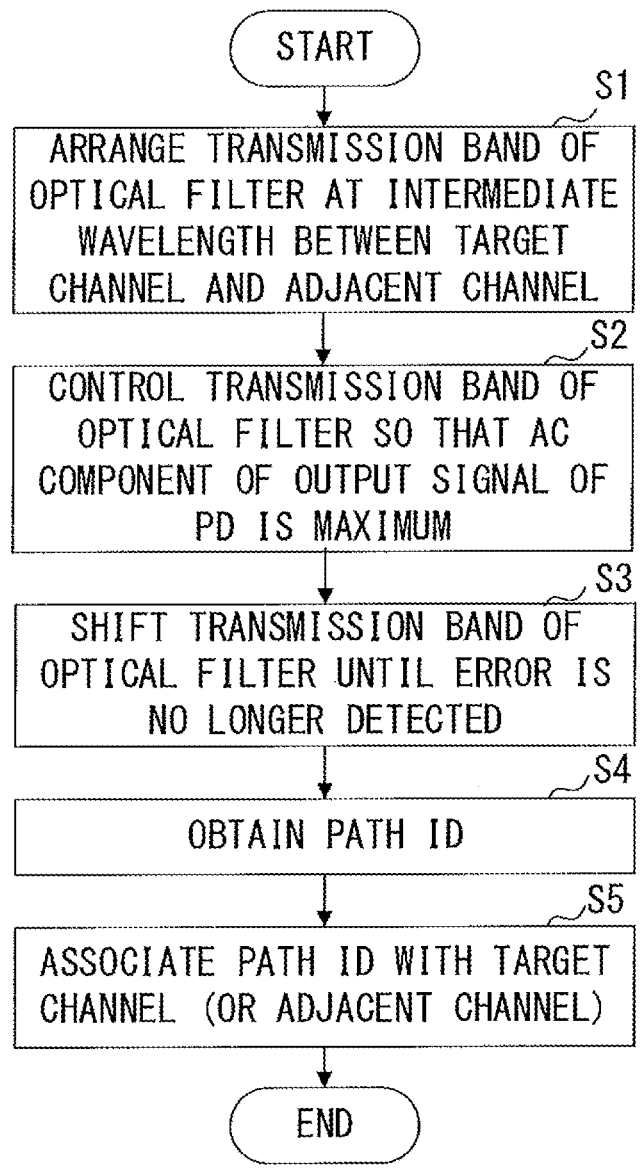
FIG. 11 is a flowchart that illustrates an example of a method for receiving an optical signal according to the first embodiment.

FIG. 11 is a flowchart that illustrates an example of a method for receiving an optical signal according to the first embodiment. Processing in the flowchart is performed when information that specifies a target channel is given to the CPU 53.

In S1, the controller 54 gives, to the filter controller 55, initial wavelength information indicating an initial wavelength for the target channel. In this embodiment, "initial wavelength for the target channel" refers to an intermediate wavelength between the center wavelength of the target channel and the center wavelength of an adjacent channel that is adjacent on the long wavelength side of the target channel. The filter controller 55 generates a filter control signal according to the given initial wavelength information. As a result, the center wavelength of the transmission band of the wavelength tunable optical filter 51 is configured at an intermediate wavelength between the center wavelength of the target channel and the center wavelength of the adjacent channel. For example, when the wavelength channel CH2 illustrated in FIG. 9 is specified as a target channel, the center wavelength of the transmission band of the wavelength tunable optical filter 51 is controlled so as to $\lambda 5$. The controller 54 gives, to the signal processor 56, a channel ID that identifies the target channel.

In S2, the optical power detector 57 and the filter controller 55 control the center wavelength of the transmission band of the wavelength tunable optical filter 51 so that the AC component of the output signal of the photo detector 52 is maximum. In other words, a feedback control is performed so that the amplitude of an intensity signal generated by the wavelength tunable optical filter 51 and the photo detector 52 is maximum. In this feedback control, for example, the amplitude of the intensity signal is monitored while sweeping the wavelength of the transmission band of the wavelength tunable optical filter 51 in a wavelength range between the target channel and the adjacent channel. As a result, the center wavelength of the transmission band of the wavelength tunable optical filter 51 is controlled so that a sum of an intensity signal component due to the FSK signal of the target channel and an intensity signal component due to the FSK signal of the adjacent channel is maximum.

In S3, the signal detector 58 detects an FSK signal according to the above described intensity signal. However, when the process of S2 is completed, the center wavelength of the transmission band of the wavelength tunable optical filter 51 is arranged in an intermediate between a wavelength range in which the FSK signal of the target channel is detected and a wavelength range in which the FSK signal of the adjacent channel is detected. Therefore, the signal detector 58 and the filter controller 55 shift the transmission band of the wavelength tunable optical filter 51 in a direction approaching the center wavelength of the target channel. In this embodiment, the transmission band of the wavelength tunable optical filter 51 is arranged between the wavelength of the target channel and the wavelength of a wavelength channel that is adjacent on the long wavelength side of the target channel. Therefore, the signal detector 58 and the filter controller 55 shift the transmission band of the wavelength tunable optical filter 51 toward the short wavelength side.

At this point, the signal detector 58 continues to detect the path ID signal of FIG. 3 that is transmitted as an FSK signal. The error detector 58a monitors an error in the path ID signal using an error detection code. The error detector 58a and the filter controller 55 shift the transmission band of the wavelength tunable optical filter 51 toward the short wavelength side until an error in the path ID signal is no longer detected.

In S4, the path ID and channel association unit 59 obtains a path ID stored in the payload of the path ID signal. In S5, the path ID and channel association unit 59 associates the obtained path ID with the target channel. At this point, the path ID and channel association unit 59 may store the path ID in a memory in association with the channel ID of the target channel.

FIG. 12A to FIG. 12C illustrate an example of a control of a transmission band wavelength according to the first embodiment. In this example, it is assumed that the transmission band of the wavelength tunable optical filter 51 is configured between a target channel and an adjacent channel on the long wavelength side of the target channel. Further, the target channel is the wavelength channel CH2, and the adjacent channel is the wavelength channel CH3. FIG. 12A illustrates a portion of the optical power spectrum of a main data signal.

When the process of S2 in the flowchart of FIG. 11 is completed, the transmission band of the wavelength tunable optical filter 51 is arranged in an approximately intermediate between a wavelength range in which an intensity signal component due to the FSK signal of the wavelength channel CH2 is detected and a wavelength range in which an intensity signal component due to the FSK signal of the wavelength channel CH3 is detected, as illustrated in FIG. 12B. Therefore, since the output light of the wavelength tunable optical filter 51 includes the FSK signal component of the wavelength channel CH2 and the FSK signal component of the wavelength channel CH3, it is difficult to detect a path ID signal from the output light of the wavelength tunable optical filter 51.

In S3, as illustrated in FIG. 12C, the transmission band of the wavelength tunable optical filter 51 is shifted in a direction approaching the center wavelength of the wavelength channel CH2. As a result, the FSK signal component of the wavelength channel CH2 is dominant in the output light of the wavelength tunable optical filter 51. Thus, the signal processor 56 can accurately detect the FSK signal component of the wavelength channel CH2 and correctly obtain the path ID of the wavelength channel CH2.

In the above described example, after the transmission band of the wavelength tunable optical filter 51 is configured between a target channel and an adjacent channel on the long wavelength side of the target channel, the path ID of the target channel is obtained by shifting the transmission band toward the short wavelength side, and the path ID of the adjacent channel is obtained by shifting the transmission band toward the long wavelength side. On the other hand, when the transmission band of the wavelength tunable optical filter 51 is configured between the target channel and the adjacent channel on the short wavelength side of the target channel, the path ID of the target channel is obtained by shifting the transmission band toward the long wavelength side, and the path ID of the adjacent channel is obtained by shifting the transmission band toward the short wavelength side.

Note that a path ID of a target channel may be obtained without performing the processes of S1 and S2 in the flowchart of FIG. 11. For example, when searching for a wavelength in which an error in a path ID signal is no longer detected while sweeping the wavelength of the transmission band of the wavelength tunable optical filter 51, the path ID of the target channel can be obtained. However, by use of this method, the transmission band of the wavelength tunable optical filter 51 has to be swept in a wide wavelength range, so it takes a longer time to determine an optimal wavelength. On the other hand, by use of the method according to the first embodiment, it is possible to start the process of S3 near an optimal wavelength by performing the processes of S1 and S2, which results in identifying the path ID of the target channel in a short time period.

In this case, an FSK signal varies the frequency of an optical signal that transmits main data, so preferably, the bitrate of the FSK signal is sufficiently low so as not to degrade a quality of the main signal. For example, it is assumed that the bitrate of the FSK signal is 512 bps. In this case, when the length of an FSK frame that transmits the FSK signal is 256 bits, the optical receiver 50 receives two FSK frames for each second. In other words, the optical receiver 50 is able to perform error detection processing only twice a second. Therefore, when using the method for searching for a transmission band wavelength in which an error is not detected while sweeping the transmission band of the wavelength tunable optical filter 51 in a wide wavelength range, it takes a long search time. The configuration and method according to the first embodiment mitigates the problem, which results in reducing the time needed for identifying a path ID of a target channel.

Further, in the above described example, the signal detector 58 detects an error in a path ID signal using an error detection code, but the embodiments of the present invention are not limited to this method. For example, the path ID signal may be provided with an error correction code instead of the error detection code. In this case, in S3 in the flowchart of FIG. 11, the signal detector 58 may shift the transmission band of the wavelength tunable optical filter 51 until all errors in the path ID signal are corrected using the error correction code. For example, when the error correction code is able to correct an error of 1 bit, the signal detector 58 may shift the transmission band of the wavelength tunable optical filter 51 until the error in the path ID signal becomes 1 bit.

Second Embodiment

As described above, in order to detect an FSK signal superimposed on an optical signal, the transmission band of an optical filter is arranged at a wavelength shifted by a specified amount with respect to the center wavelength of the spectrum of the target optical signal. However, the phase of an FSK signal that is detected when arranging the transmission band on the short wavelength side with respect to the center wavelength of the spectrum of the optical signal is different from that of an FSK signal that is detected when arranging the transmission band on the long wavelength side of it. A method for receiving an optical signal according to a second embodiment detects an FSK signal using the characteristics of the phases of the detected FSK signals.

Figures 13A, 13B:
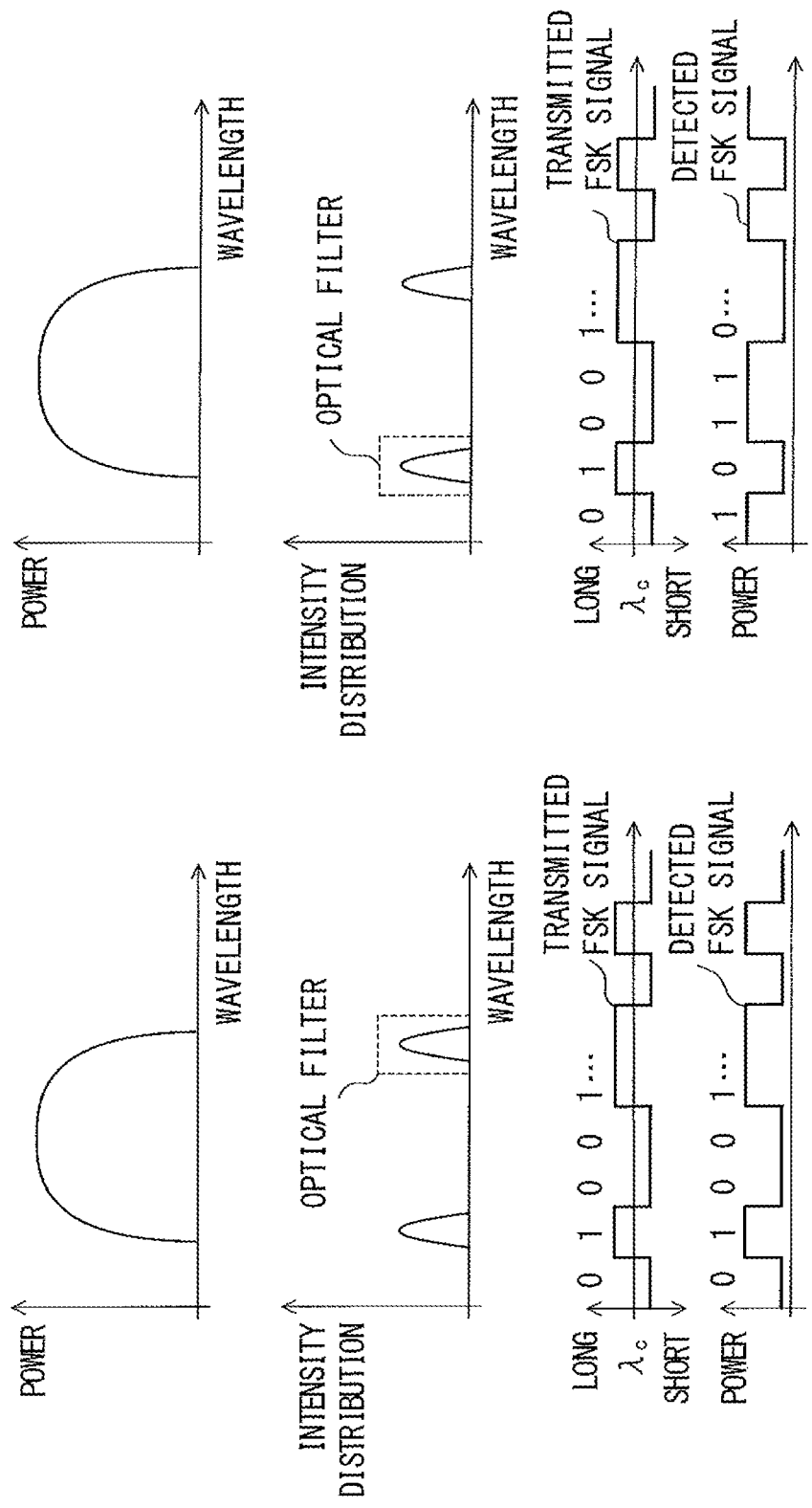
FIG. 13A and FIG. 13B illustrate relationships between the allocation of the transmission band of an optical filter and the phase of a detected FSK signal.

FIG. 13A and FIG. 13B illustrate relationships between the arrangement of the transmission band of an optical filter and the phase of a detected FSK signal. In FIG. 13A and FIG. 13B, a binary FSK signal is superimposed on an optical signal. Further, as described above, an FSK signal is detected in a wavelength range in which the slope of the spectrum of the optical signal is steep. In the following description, it is assumed that the wavelength of the optical signal is shifted toward the long wavelength side when an FSK signal transmitted from a transmitter is "1", and that the wavelength of the optical signal is shifted toward the short wavelength side when the FSK signal is "0".

In the case of FIG. 13A, the transmission band of the optical filter is arranged on the long wavelength side with respect to the center wavelength of the spectrum of the optical signal. In this case, the power of the output light of the optical filter is increased when the wavelength of the optical signal is shifted by the FSK signal toward the long wavelength side. On the other hand, the power of the output light of the optical filter is decreased when the wavelength of the optical signal is shifted by the FSK signal toward the short wavelength side. In other words, the phase of a transmitted FSK signal (an FSK signal superimposed on the optical signal in the transmitter) and the phase of a detected FSK signal (an FSK signal detected in an optical receiver) are identical to each other.

In the case of FIG. 13B, the transmission band of the optical filter is arranged on the short wavelength side with respect to the center wavelength of the spectrum of the optical signal. In this case, the power of the output light of the optical filter is decreased when the wavelength of the optical signal is shifted by the FSK signal toward the long wavelength side. On the other hand, the power of the output light of the optical filter is increased when the wavelength of the optical signal is shifted by the FSK signal toward the short wavelength side. In other words, the phase of the detected FSK signal is inverted with respect to the phase of the transmitted FSK signal.

Figure 14:
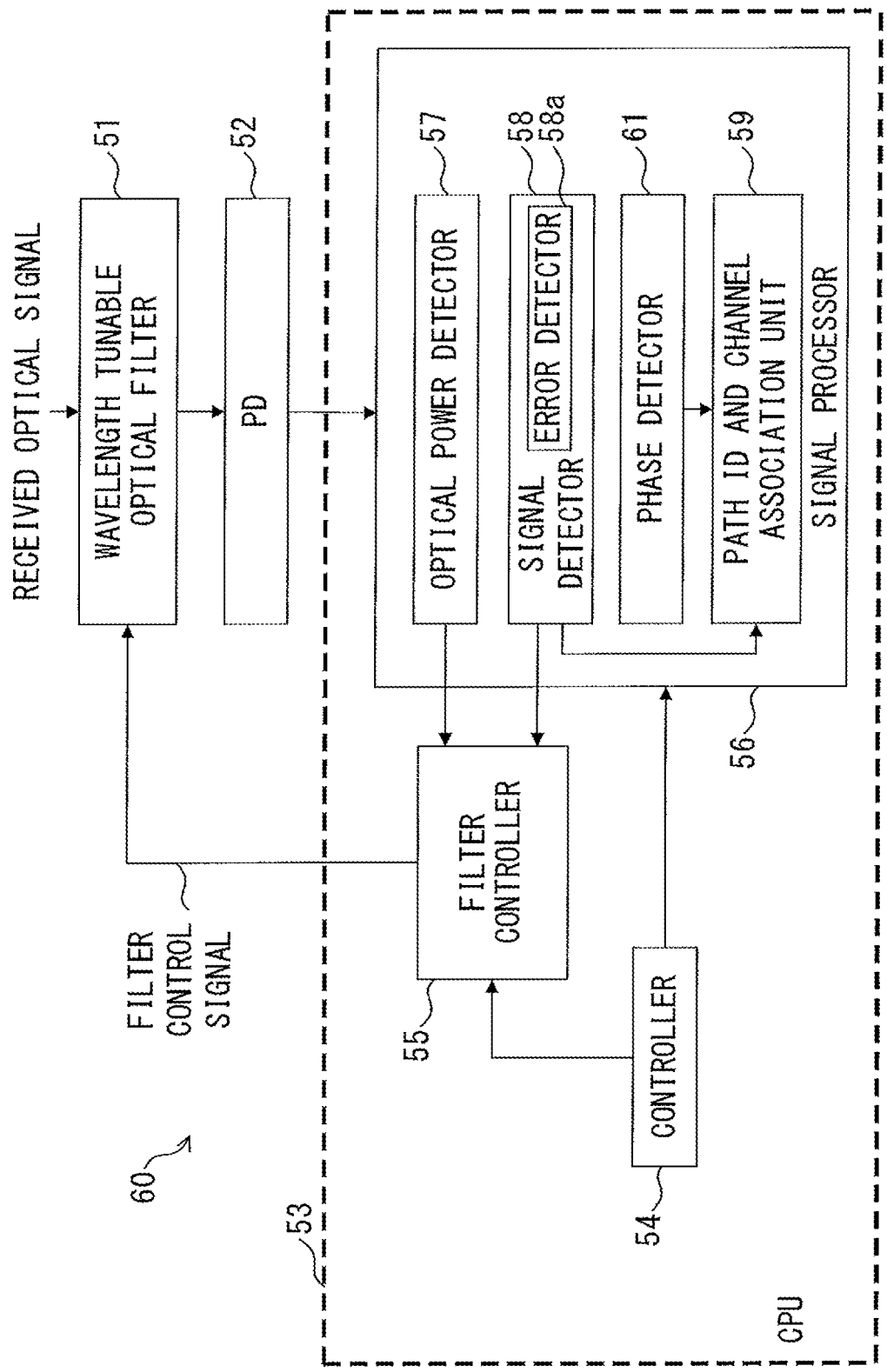
FIG. 14 illustrates an example of an optical receiver according to a second embodiment.

FIG. 14 illustrates an example of an optical receiver according to the second embodiment of the present invention. An optical receiver 60 of the second embodiment has a configuration similar to that of the optical receiver 50 of the first embodiment. However, in the second embodiment, the signal processor 56 includes a phase detector 61 in addition to the optical power detector 57, the signal detector 58, and the path ID and channel association unit 59.

The phase detector 61 decides whether an FSK signal detected by the signal detector 58 is in phase or in anti-phase with respect to a transmitted FSK signal. Here, it is assumed that the FSK signal is the path ID signal of FIG. 3. In this case, the preamble is known. In the following description, it is assumed that the preamble stores therein the fixed pattern "100100".

In this case, when the FSK signal detected by the signal detector 58 includes "100100", the phase detector 61 decides that the detected FSK signal is in phase with the transmitted FSK signal. On the other hand, when the FSK signal detected by the signal detector 58 includes "011011", the phase detector 61 decides that the detected FSK signal is in anti-phase with respect to the transmitted FSK signal.

FIG. 15 is a flowchart that illustrates an example of a method for receiving an optical signal according to the second embodiment. Processing in the flowchart is performed when information that specifies a target channel is given to the CPU 53. The processes of S1-S4 are substantially the same in the first and second embodiments. In other words, the wavelength tunable optical filter 51 is controlled so that an AC component of the output signal of the photo detector 52 is maximum, and after that, the wavelength tunable optical filter 51 is controlled until an error in a path ID signal is no longer detected. Then, a path ID is obtained from a received signal when the wavelength of the transmission band of the wavelength tunable optical filter 51 is optimized.

In S11 and S12, the phase detector 61 decides whether the detected FSK signal is in phase or in anti-phase with respect to the transmitted FSK signal. When the detected FSK signal is in phase with the transmitted FSK signal, in S13, the path ID and channel association unit 59 associates the obtained path ID with a wavelength channel arranged on the short wavelength side with respect to the center wavelength of the transmission band of the wavelength tunable optical filter 51 that is controlled in S1-S3. On the other hand, when the detected FSK signal is in anti-phase with respect to the transmitted FSK signal, in S14, the path ID and channel association unit 59 associates the obtained path ID with a wavelength channel arranged on the long wavelength side with respect to the center wavelength of the transmission band of the wavelength tunable optical filter 51 that is controlled in S1-S3.

For example, it is assumed that processing in the flowchart of FIG. 15 is performed after the transmission band of the wavelength tunable optical filter 51 is arranged at an intermediate wavelength between the wavelength channel CH2 and the wavelength channel CH3. Here, the wavelength channel CH3 is adjacent to the long wavelength side of the wavelength channel CH2. In this case, when the detected FSK signal is decided to be in phase with respect to the transmitted FSK signal, the path ID and channel association unit 59 associates the path ID obtained from the detected FSK signal with the wavelength channel CH2. On the other hand, when the detected FSK signal is decided to be in anti-phase with respect to the transmitted FSK signal, the path ID and channel association unit 59 associates the path ID obtained from the detected FSK signal with the wavelength channel CH3.

The filter controller 55 may arrange the transmission band of the wavelength tunable optical filter 51 between a target channel and a wavelength channel that is adjacent on the short wavelength side of the target channel. In this case, when the detected FSK signal is in phase with respect to the transmitted FSK signal, the path ID and channel association unit 59 associates the obtained path ID with the wavelength channel arranged on the long wavelength side with respect to the center of the transmission band of the wavelength tunable optical filter 51. On the other hand, when the detected FSK signal is in anti-phase with respect to the transmitted FSK signal, the path ID and channel association unit 59 associates the obtained path ID with the wavelength channel arranged on the short wavelength side with respect to the center of the transmission band of the wavelength tunable optical filter 51.

The method for deciding whether a detected FSK signal is in phase or in anti-phase with respect to a transmitted FSK signal is not limited to the above described embodiment. The signal detector 58 performs an error detection on a path ID signal on the assumption that a detected FSK signal is in phase with respect to a transmitted FSK signal, and performs an error detection on the path ID signal on the assumption that the detected FSK signal is in anti-phase with respect to the transmitted FSK signal. Then, the phase detector 61 may decides that the assumption wherein an error is not detected in the path ID signal is correct and may associate a path ID obtained from the detected path ID signal with a wavelength channel according to the decision result.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical receiver that receives a wavelength multiplexed optical signal including a plurality of wavelength channels, a superimposition signal being superimposed by frequency modulation on each of the wavelength channels, the optical receiver comprising:
    an optical filter that filters the wavelength multiplexed optical signal;
    a photo detector that generates an intensity signal representing a change in an intensity of output light of the optical filter;
    an amplitude detector that detects an amplitude of the intensity signal output from the photo detector;
    a signal detector that detects, according to the intensity signal generated by the photo detector, a superimposition signal superimposed on a specified wavelength channel;
    an error detector that detects an error in the superimposition signal detected by the signal detector; and
    a filter controller that controls a wavelength of a transmission band of the optical filter according to the amplitude detected by the amplitude detector and the number of errors detected by the error detector, wherein
    the filter controller controls the wavelength of the transmission band of the optical filter so that the amplitude of the intensity signal detected by the amplitude detector increases, and then controls the wavelength of the transmission band of the optical filter so that the number of errors in the superimposition signal detected by the signal detector is reduced.

2. The optical receiver according to claim 1, wherein
    the frequency modulated signal includes an error detection code, and
    the error detector detects an error in the superimposition signal detected by the signal detector using the error detection code.

3. The optical receiver according to claim 1, wherein
    the filter controller controls a center of the transmission band of the optical filter at a first wavelength so that the amplitude of the intensity signal reaches a peak, and then controls the center of the transmission band of the optical filter at a second wavelength so that the number of errors in the superimposition signal detected by the signal detector becomes zero.

4. The optical receiver according to claim 3, further comprising
    an association unit that associates data that is represented by the superimposition signal detected by the signal detector with a wavelength channel adjacently arranged on the short wavelength side of the second wavelength when the second wavelength is shorter than the first wavelength, and that associates the data with a wavelength channel adjacently arranged on the long wavelength side of the second wavelength when the second wavelength is longer than the first wavelength.

5. The optical receiver according to claim 3, further comprising:
    a phase detector that decides whether the superimposition signal detected by the signal detector is inverted with respect to a superimposition signal transmitted from a transmitter of the wavelength multiplexed optical signal; and
    an association unit that associates data that is represented by the superimposition signal detected by the signal detector with one of a first wavelength channel adjacently arranged on the short wavelength side of the second wavelength and a second wavelength channel adjacently arranged on the long wavelength side of the second wavelength when the superimposition signal detected by the signal detector is not inverted, and that associates the data with the other of the first wavelength channel and the second wavelength channel when the superimposition signal detected by the signal detector is inverted.

6. A method for receiving a wavelength multiplexed optical signal including a plurality of wavelength channels, a superimposition signal being superimposed by frequency modulation on each of the wavelength channels, the method comprising:
    filtering the wavelength multiplexed optical signal using an optical filter;
    generating, using a photo detector, an intensity signal representing a change in an intensity of output light of the optical filter;
    detecting, using an amplitude detector, an amplitude of the intensity signal output from the photo detector;

detecting, according to the intensity signal, a superimposition signal superimposed on a specified wavelength channel;

detecting, using an error detector, an error in the superimposition signal;

receiving an output signal of the amplitude detector and performing a feedback control to control a center of the transmission band of the optical filter at a first wavelength so that the amplitude of the intensity signal increases;

receiving an output signal of the error detector and performing a feedback control to control the center of the transmission band of the optical filter at a second wavelength so that the number of errors in the superimposition signal is reduced, after the center of the transmission band of the optical filter is controlled at the first wavelength; and detecting, according to the intensity signal, the superimposition signal superimposed on the specified wavelength channel when the center of the transmission band of the optical filter is controlled at the second wavelength.

\* \* \* \* \*